Sept. 30, 1952 D. H. JUNE 2,612,200
COIN PURSE AND THE LIKE
Filed March 10, 1950
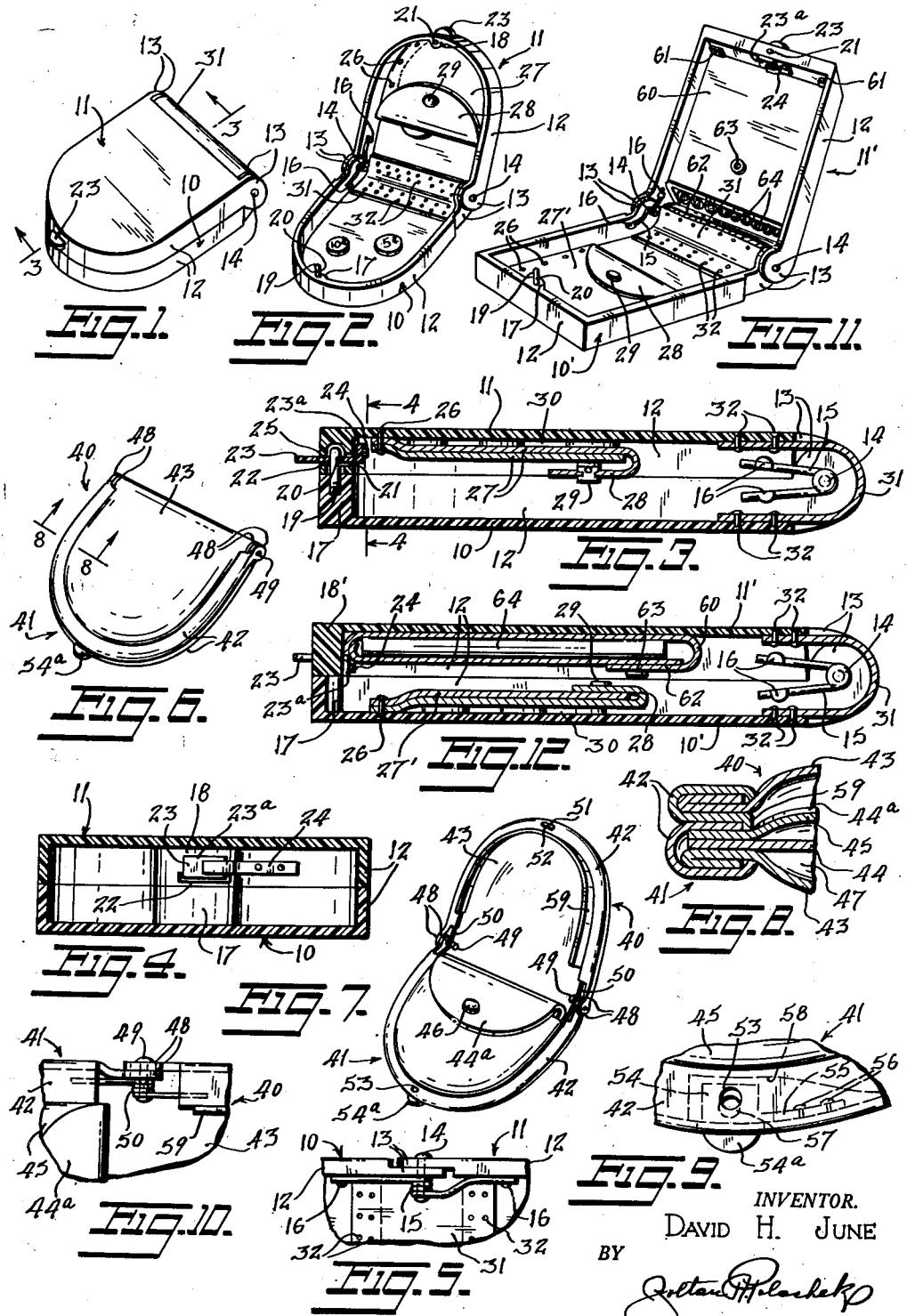
INVENTOR.
DAVID H. JUNE
BY
ATTORNEY Patented Sept. 30, 1952

2,612,200

UNITED STATES PATENT OFFICE 2,612,200

COIN PURSE AND THE LIKE

David H. June, Bronx, N. Y.

Application March 10, 1950, Serial No. 148,800

3 Claims. (Cl. 150—35)

This invention relates to new and useful improvements in purses and the like, and has for its principal object the provision of a latchable purse having secured therein a pocket for bills and the like and beneath the pocket a space for coins.

Another object of the invention is to construct and arrange the purse so that the pocket and coin space are located in one of two folding members and the other member is adapted to receive the coins as they are shaken from their lodging place.

Still another object of the invention is to secure the pocket in place so as to provide for increasing the space available for coins.

A further object of the invention is to construct the purse so as to provide for the economical manufacture thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the purse in its closed position.

Fig. 2 is a perspective view of the purse in its open position.

Fig. 3 is an enlarged sectional view taken on the line 3—3 of Fig. 1.

Fig. 4 is a sectional view taken on the line 4—4 of Fig. 3.

Fig. 5 is an enlarged detailed plan view of one of the hinge connections.

Fig. 6 is a perspective view similar to Fig. 1, but illustrating the purse or the like constructed in accordance with a modification of the present invention.

Fig. 7 is an enlarged perspective view of the purse shown in Fig. 6 in its open position.

Fig. 8 is an enlarged partial sectional view taken on the line 8—8 of Fig. 6.

Fig. 9 is an enlarged detailed plan view of a portion of Fig. 7.

Fig. 10 is an enlarged detailed plan view of one of the hinge connections employed in the form of the invention shown in Figs. 6 to 9.

Fig. 11 is an open perspective view of the purse or the like constructed in accordance with a further modification of the invention to embody a cigarette case.

Fig. 12 is an enlarged sectional view of the purse of Fig. 11 in its closed position.

The purse or the like in accordance with the first form of the invention illustrated in Figs. 1 to 5, includes a pair of like shells 10 and 11 of plastic or reinforced leather or fabric, each having one open end. The shells 10 and 11 are bounded on their three sides, except at their open ends, by inwardly directed side walls 12. The free ends of the side walls 12 are formed with overlapped lugs 13, see particularly Fig. 5, formed with aligned holes through which pivot pins 14 extend pivotally connecting the shells 10 and 11 together. The pivot pins 14 are in end alignment so that the shells 10 and 11 can be freely pivoted between open and closed positions. Concentrically wound upon the shank of each of the pins 14, within the shells 10 and 11, there is a spring 15. The free ends of the springs 15 are extended in opposite directions along the inner faces of the side walls 12 of the shells 10 and 11 and are engaged with lugs 16 so as to exert a force tending to urge the shells to their open position shown in Fig. 2.

The walls 12 of shells 10 and 11 are thickened somewhat at the outer ends of the shells as at 17 and 18 to provide for means to latch the shells in their closed position shown in Fig. 1. The thickened portion 17 is provided with a latching pin 19 projecting vertically therefrom, said pin having therein a transverse notch 20, see Figs. 2 and 3. The thickened portion 18 is provided with a hole 21 to receive the pin 19 and with a slot 22 at right angles to, and encompassing the mid-length portion of said hole. Mounted in the slot 22 is a latching slide 23 having a portion thereof extending outwardly beyond the respective side wall 12 for engagement by the fingers and a portion 23ª extending upward within the wall 12. The upwardly extending portion 23ª is acted on by a leaf spring 24 which tensions the slide 23 outward. The slide 23 has therein a slot 25 through which projects the pin 19 when the parts are in the position of Fig. 3.

The construction is such that the edge of slot 25 in the slide 23 is normally held in the notch 20 in pin 19 by the spring 24, latching the parts in the position of Figs. 1 and 3, but if the slide 23 is pushed inwardly by the fingers, the pin 19 is freed and the springs 15 swing the shells 10 and 11 to the open position shown in Fig. 2.

The shell 11 has secured therein in any suitable manner such as by decorative rivets 26, a pocket 27, for paper bills and the like, of leather or the like. The pocket 27 is of the usual construction and has a protective closing flap 28 held in closed position by an ordinary snap fastener 29. The pocket 27 is secured to the shell 11 along its edges but the edge thereof adjacent shell 10 is left free so that a space 30 for coins is provided therebeneath.

The construction is such that the purse, having been opened as described above, the bills in the pocket 27 can be obtained by opening the flap 28, and the coins can be obtained simply by shaking them from the space 30 into the shell 10 where the correct one or ones can readily be picked out.

In order to seal the purse when the same is in the closed position of Fig. 1, that is to say, seal the open ends of the shells 10 and 11, the shells may be lined in any suitable manner. Preferably, however, a strip 31 of leather or the like, is secured to both shells between the side walls 12 by rows of decorative rivets 32, so that the strip 31 assumes the position shown in Figs. 1 and 3 in the closed position of the purse.

In the modification of the invention shown in Figs. 6 to 10, the purse is of a different construction and is comprised of shells 40 and 41 each of which is comprisesd of a C-shaped frame 42. The frames 42 have their open sides directed toward one another, and are formed of channel-shaped metallic material and have their open sides directed inward.

The main body of the purse is formed of a piece of leather 43 of a length corresponding to the combined length of the frames 42 when in their open position. The peripheral edges of the piece of leather 43 are extended into the open sides of the frames 42, after being doubled over upon themselves, see Fig. 8, and the frames are clamped about those edge portions to mount the frames thereon.

Within the shell 41, there is provided superimposed pieces of leather 44 and 45 which also have their edge portions clamped in position within the frame of that shell and which form a pocket for folded paper money. The piece of leather 44 continues into a flap portion 44ª which is arranged to be releasibly attached to the outer face of the piece of leather 45 by a snap fastener 46 for closing the open side of the bill pocket which faces the shell 40. The pieces of leather are shaped to provide a space 47, see Fig. 8, between the adjacent faces of the piece of leather 43 and the piece of leather 44 within the shell 41 for containing coins in the closed position of the purse. When the purse is in the open position shown in Fig. 7, the coins can be shaken from the space 47 into the shell 40 where they can be easily seen to be picked out.

The adjacent ends of the frames 42 of the shells 40 and 41 are formed with overlapped lugs 48 formed with aligned holes through which pivot pins 49 are passed. The pins 49 are in end alignment so that the shells 40 and 41 can be freely pivoted between open and closed positions. Concentrically wound upon the shanks of the pins 49 there are springs 50 which have their ends projected into the open ends of the frames 42 for urging the shells 40 and 41 into their open position shown in Fig. 7.

Latch means is provided for retaining the shells 40 and 41 in their closed position against the action of the springs 50. The latch means is comprised of a pin 51 which is formed with a notch 52 and which projects from the inner face of the frame 42 of the shell 40. The frame 42 of the shell 41 is formed with a complementary hole 53 for receiving the free end of the pin 51 in the closed position of the shells 40 and 41. A slide 54 is mounted within the frame 42 of the shell 41 and within that frame, the slide 54 has a spring 55 integrally projecting from one side thereof, see Fig. 9. The free end of the spring 55 is secured to the frame 42 by rivets 56 for urging the slide 54 into a position in which a hole 57 in that slide will be out of alignment with the hole 53 of the frame. The free end of the pin 51 is slightly rounded so that when the shells 40 and 41 are being closed the free end of the pin 51 will enter the hole 53 and move the slide against the action of the spring 55 so that the material of the slide 54 defining its hole 57 can enter the notch 52 of the pin 51 and lock the shells 40 and 41 in their closed position.

The slide 54 has a portion 54ª projecting outwardly beyond the frame 42 of the shell 41 by which the slide 54 can be urged inward against the action of the spring 55, to align the hole 57 of the slide with the hole 53 of the frame 42 and free the pin 51 so that the shell 40 can be urged to the open position with relation to the shell 41, as seen in Fig. 7. From the dotted line 58, in Fig. 9, it is apparent that the edge portions of the pieces of leather 43, 44 and 45 are cut out within the frame 42 of the shell 41 to provide clearance for the slide 54 and related parts.

The inner periphery of the frame 42 of the shell 40 is formed with a right angular inwardly directed flange 59 which engages the inner periphery of the frame 42 of the shell 41, see Fig. 8, in the closed position of the shells to retain the shells against lateral shifting.

The further modification of the invention shown in Figs. 11 and 12 is similar to that illustrated in Figs. 1 to 5 except that the shells 10' and 11' are rectangular in shape. In addition, the bill pocket 27', within the shell 10' is smaller than the bill pocket 27 of the first form of the invention to provide space within that shell 10' for sorting the coins shaken from the space 30 beneath the bill pocket 27'.

The shell 11' is provided with a cigarette case 60. The case 60 may be of any material and of any desired form and has a pair of tabs 61 at the closed end thereof, said tabs being secured to the thickened portion 18' of the side wall 12 of the shell 11'. Thus the cigarette case 60 is, in effect, pivoted to the thickened portion 18' and the free end thereof can be lifted out of the shell 11' to gain access to the cigarettes therein at the open end of the case 60.

One wall of the cigarette case continues into a flap 62, shown partly in section in Fig. 11, which is releasably retained in a closed position by a snap fastener 63 for retaining the cigarette 64 in position within the case 60.

In other respects, the form of the invention shown in Figs. 11 and 12 is similar to that shown in Figs. 1 to 5 and like reference numerals are used in the two forms of the invention to identify like parts.

While the purses illustrated on the drawings are designed specifically for containing coins, paper money and cigarettes, it is appreciated that similar purses could be designed for enclosing in addition to coins and paper money, such things as eyeglasses, travelling clocks, watches and other similar articles without departing from the intent and scope of the present invention.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A purse comprising a pair of rigid one-piece, like, open end, oppositely disposed shells, hinge means connecting said shells together to be pivoted to a closed position, a pocketbook for bills secured in one of said shells, said pocketbook opening toward said other shell and having a protective flap and a snap fastener to maintain the same closed, and a strip of material secured to the inner faces of said rigid shells to seal the said open ends thereof when the purse is closed.

2. A purse comprising a pair of rigid one-piece, like, open end, oppositely disposed shells, hinge means connecting said shells together to be pivoted to a closed position, a pocketbook for bills secured in one of said shells, said pocketbook opening toward said other shell and having a protective flap and a snap fastener to maintain the same closed, and an elongated strip of material secured to the inner faces of said rigid shells to seal the said open ends thereof when the purse is closed, said strip of material being of a width greater than the space between the shells at their open ends when the shells are closed and having its longitudinal side edges secured to said shells inward of their open ends so that said strip of material will assume a curvature concentric with said hinge means when said shells are closed.

3. A purse comprising a pair of rigid one-piece, like, oppositely disposed hollow shells, hinge means connecting said shells together to be pivoted to a closed position, a pocket for bills secured in one of said shells, the edge thereof adjacent the other shell being left free to provide an opening through which coins can be inserted beneath said pocket, a cigarette case positioned in the other of said shells and having one end open to receive cigarettes, and a pair of tabs extended laterally from the closed end of said case and secured to the said other shell whereby said case may be pivoted at its open end out of the said other shell.

DAVID H. JUNE.

REFERENCES CITED

The following references are of record in the file of this patent:

UNITED STATES PATENTS

| Number | Name | Date |
| --- | --- | --- |
| 284,364 | Beard et al. | Sept. 4, 1883 |
| 439,086 | Albright | Oct. 28, 1890 |
| 533,743 | Prahar | Feb. 5, 1895 |
| 629,821 | Scheuer | Aug. 1, 1899 |
| 660,847 | Von Eigen | Oct. 30, 1900 |
| 860,718 | Wilkins | July 23, 1907 |
| 1,704,285 | Dunn et al. | Mar. 5, 1929 |
| 2,217,556 | Lupfer et al. | Oct. 8, 1940 |

FOREIGN PATENTS

| Number | Country | Date |
| --- | --- | --- |
| 12,148 | Great Britain | June 23, 1894 |
| 9,440 | Great Britain | Apr. 25, 1904 |
| 716,346 | France | Oct. 6, 1931 |
| 804,720 | France | Aug. 10, 1936 |